(No Model.) 2 Sheets—Sheet 2.

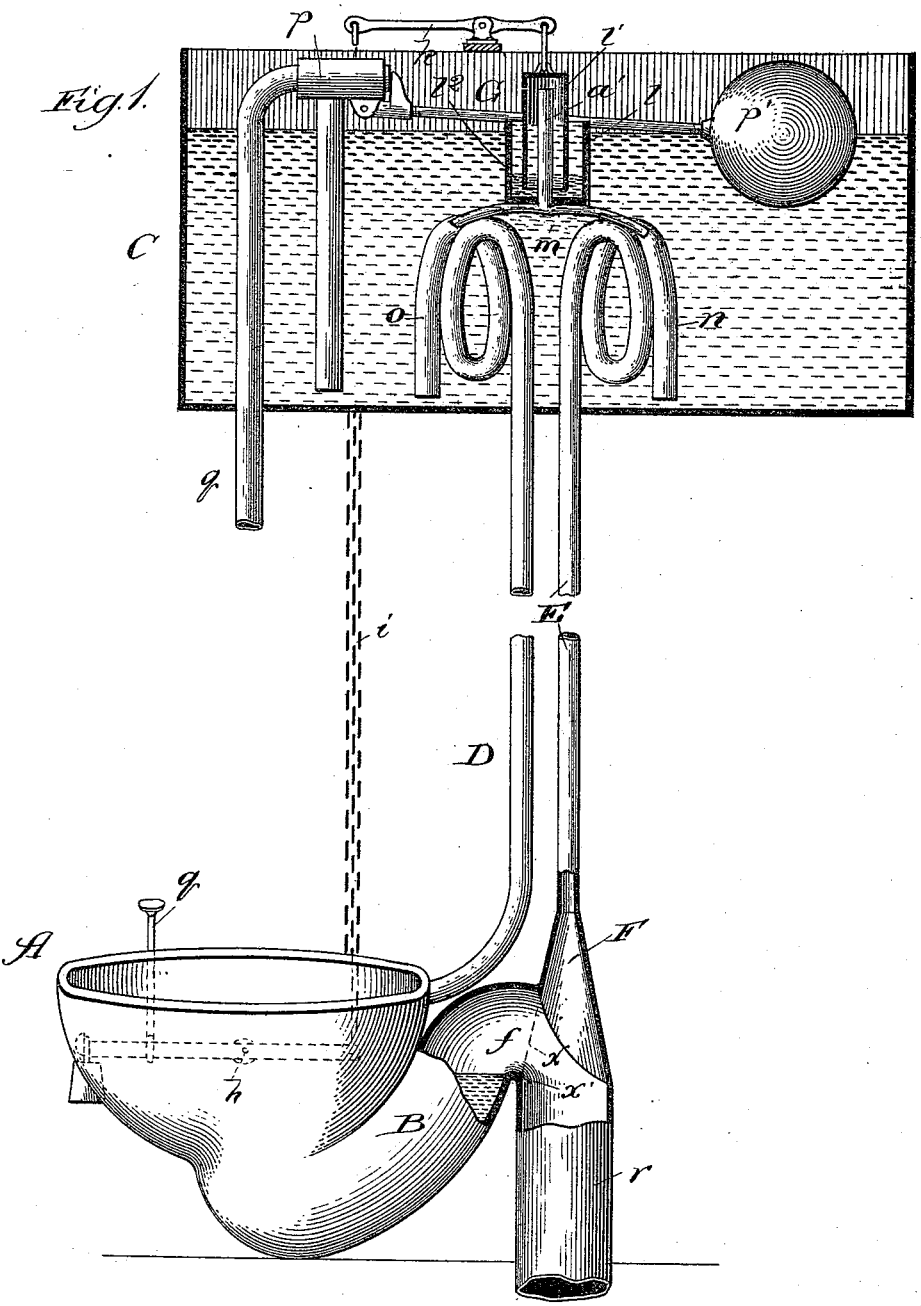

D. WHITEFORD.
WATER CLOSET.

No. 442,564. Patented Dec. 9, 1890.

Witnesses:

Inventor:
David Whiteford,
By Dyrenforth & Dyrenforth,
Attys.

UNITED STATES PATENT OFFICE.

DAVID WHITEFORD, OF CHICAGO, ILLINOIS.

WATER-CLOSET.

SPECIFICATION forming part of Letters Patent No. 442,564, dated December 9, 1890.

Application filed February 20, 1890. Serial No. 341,094. (No model.)

*To all whom it may concern:*

Be it known that I, DAVID WHITEFORD, a citizen of the United States, residing at Chicago, in the county of Cook and State of Illinois, have invented a new and useful Improvement in Water-Closets, of which the following is a specification.

My invention relates to an improvement in the class of water-closets in which provision is made when the communication between the flushing-tank and bowl is opened for the flushing operation for relieving the trap of its air-bound condition, thereby to produce ready evacuation of the bowl into the soil-pipe.

The primary object of my improvement is to provide a simple but thoroughly effective and reliably operative contrivance which shall serve to produce rapid discharge of the contents of the bowl when the flushing-water is admitted to it from the tank; and it is furthermore my object to provide means for producing at will siphon action in the flushing-tank, which means shall effectually trap the communication with the tank of the soil-pipe.

My further object is to provide a generally-improved construction of water-closet.

Figure 2:
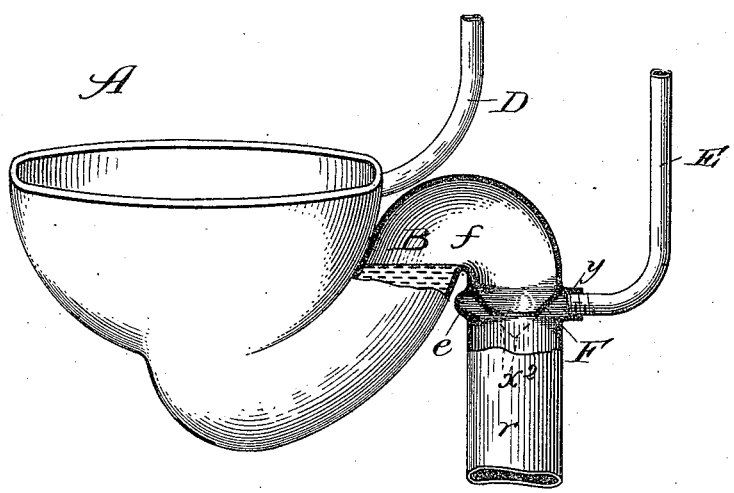

In the accompanying drawings, Figure 1 is a view in partly sectional and broken elevation of a water-closet of my improved construction; Fig. 2, a broken view in elevation of the bowl portion, showing a modified construction of the main feature of my improvement; and Fig. 3, a similar view showing the siphon mechanism in the tank in a modified form.

A is the bowl, and B is the trap connecting the bowl with the leg $r$, which may be a part of the soil-pipe or a branch leading into it, all of which parts may be of any well-known or suitable construction for the kind of apparatus to which my improvement relates.

C is the overhead tank to contain the water for flushing, the supply of which through a pipe $q$ may be automatically controlled by common means for the purpose in the form of a valve $p$, regulated by a float $p'$, connected with the valve. A pipe D communicates at one end with the flushing-rim of the bowl A and extends into the tank C, wherein it is coiled at its upper end into preferably two convolutions, as shown, terminating in a leg $o$. A pipe E, extending, like the pipe D, into the tank, similarly coiled, and terminating in a leg $n$, leads from the tank into the leg $r$ or soil-pipe, and is provided with a cone-shaped termination F at its lower end, where it is joined to the leg $r$ or soil-pipe. This conical terminus of the pipe E, which forms the main feature of my improvement, and which I desire to secure by Letters Patent irrespective of the other mechanism provided with the tank for producing the flushing operation, may flare in a downward direction, as shown in Fig. 1, or in an upward direction, as shown in Fig. 2. If the former, I have found the most effective operation to be produced by making the conical terminus F not less than about seven inches long, and by causing it to flare from its initial or tapered extremity gradually about to the diameter of the pipe $r$, so that in communicating with the latter, as shown in Fig. 1, at its upper or curved end, it will be somewhat narrower at its base than the diameter of the pipe and would equal that diameter if extended flaringly, as indicated by the dotted line $x$ to the line $x'$ forming the upper terminus of the vertical portion of the pipe $r$ or the lower line of its junction with the trap B.

Each pipe D and E communicates from a point in the upper part of one of its convolutions, forming siphon-traps, either, separately or, as shown, through a common connecting-pipe $m$, having a branch tube $m'$, with an air-trap G in the tank C. This trap comprises a stationary chamber $l$, closed at its base and open at its top, which extends short of the water-line in the tank and containing a narrower piston-like chamber $l'$, closed at its top and open at its base and fitting inside the chamber $l$, whereby it may be moved up and down therein, as through the medium of a suitably-fulcrumed lever $k$, controlled through a chain $i$, connected at its lower end with lever mechanism $h$ at the bowl, and which may be of the well-known construction, manipulated from a handle $g$. The branch pipe $m'$ leads through the base of the chamber $l$ of the trap G beyond the water-line in the tank $l^2$ into the hollow piston $l'$, and in the chamber $l$ I provide mercury to act as an effective seal between the said chamber and branch $m'$ and control the action of the siphon, operating as hereinafter described.

Constructed as described, the operation of the apparatus is as follows: As water enters the tank C through the supply-pipe $q$ it enters the coils of the pipes D and E at the legs $o$ and $n$ and lodges in the bases of the convolutions, thereby forming a water-seal in each. When to flush the bowl the handle $g$ is manipulated, it produces raising of the hollow piston $l'$, thereby increasing the dimensions of the air-space within it above the water-line in the chamber $l$, and by the partial vacuum thus provided inducing the air contained in the convolutions of the pipes D and E between their contained water-seals and the legs $o$ and $n$ to escape into the enlarged air-chamber produced by raising the hollow piston $l'$ above the mercury-line in the chamber $l$, and thus permitting the air to escape through the water above the mercury. Then of course the water in the tank siphons through the convolutions into the pipes D and E and by way thereof into the bowl A and pipe $r$. If the pipe E were of the same diameter as shown with relation to the pipe $r$ throughout its entire length, obviously the stream emerging from it would be considerably smaller in diameter than the pipe $r$ and would exert very little, if any, suction effect at the opening $f$ between the trap B and soil-pipe or branch thereof; but, owing to the conical form of the terminus F, the stream emerging from it expands, owing to its forcible impingement against the air contained in the cone to conform to the cone, and thus fills the diameter of the pipe $r$ at the base of its communication with the trap B, thereby sucking the air out of the trap, relieving the air-bound condition thereof and drawing the contents of the bowl into the soil-pipe. The same result may be produced by causing the cone F, as shown in Fig. 2, to taper in a downward direction, provided its upper flaring end be joined to the pipe $r$ inside the latter and preferably at an enlargement $e$ therein, where or about where it meets the trap B at or near the base of the opening $f$ between the trap and soil-pipe, and then the pipe E should communicate with the pipe $r$, as shown, laterally thereof at the enlargement $e$, and should be slightly increased in diameter, as shown at $y$, where it joins the soil-pipe. When with this construction the trap G in the tank is manipulated in the manner described to remove the air in the pipes D and E, the water from the tank is drawn through the last-named pipes into the bowl by way of its flushing-rim and into the pipe $r$ by way of the downwardly-tapering conical rim F. From the conical rim F the water from the pipe E enters the pipe $r$ and converges in descending to a point, as indicated by the dotted lines at $x^2$, thereby practically filling the diameter of the waste-pipe in the sense of preventing any communicating air-space between it and the opening $f$, whereby its action effectually draws the contents of the bowl through the trap B.

Figure 3:
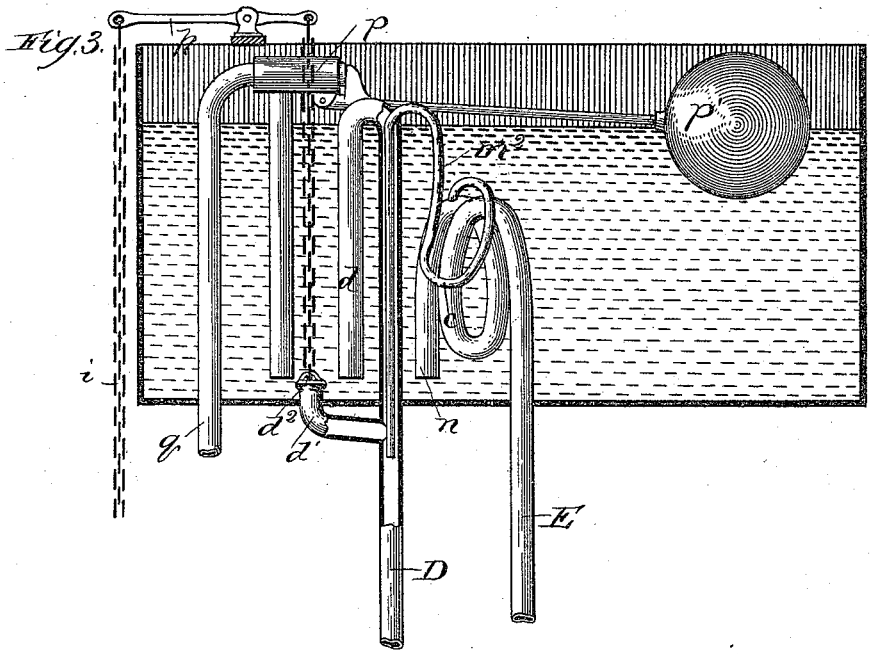

By way of illustrating that my improvement afforded by the conical medium F may be used to advantage with other forms of the tank-evacuating apparatus than that presented in Fig. 1, I have shown in Fig. 3 another form of that apparatus. The pipe E and cone F remain as in Fig. 1 or Fig. 2, and accordingly the pipe E terminates in the tank in a coil ending in a leg $n$. The flushing-pipe D, however, terminates in the tank in a single siphon-bend $d$, and near its entrance into the tank at the base of the latter it is provided with a lateral branch $d'$, leading vertically into the base of the tank, where a heavy cap $d^2$ is suspended over it from a lever $k$, controlled from the chain $i$, and which is normally in position to permit the cap $d^2$ to rest on the mouth of the branch $d'$ to close it. The pipe D is caused to communicate inside the tank with an upper point in the convoluted end of the pipe E through a branch pipe $m^2$, practically the equivalent of the branch pipe $m$, and which should be provided in its body with a small perforation $c$ and should be led into the pipe D from its top below the branch $d'$. Thus, when the flushing operation is desired, by manipulating the chain $q$ the cap is raised, permitting the tank-water to enter the pipe D and by drawing the air through the branch $m^2$ relieve the coil of the pipe E, thereby permitting the latter to act at its conical terminus F in the manner described. The perforation $c$ in the branch $m^2$ improves the action by drawing water from the tank, through the medium of which the better to pull the air. The purpose of the siphon-bend $d$ is to cause the action of emptying the tank to continue if the cap $d^2$ be only momentarily removed from its seat on the branch $d'$, as it is likely to be.

What I claim as new, and desire to secure by Letters Patent, is—

1. In a water-closet in which water from a tank is controllably supplied through pipes leading respectively into the bowl for flushing and into the waste-pipe for relieving the bowl-trap, a hollow cone F, forming the discharge end of the said water-supply pipe leading to the waste-pipe, substantially as described.

2. In a water-closet, the combination, with the flushing-tank and bowl, of a pipe D, leading from the flushing-tank to the bowl, a pipe E, leading from the flushing-tank to the bowl discharge-pipe and terminating at its lower end in a hollow cone F, and means, substantially as described, for controlling the discharge of water from the tank, substantially as set forth.

3. In a water-closet, the combination, with the flushing-tank and bowl provided with a trap B, communicating with a waste-pipe $r$, of a pipe D, leading from the flushing-tank to the bowl, a hollow cone F, communicating at its flaring extremity with the pipe r near its upper end, above the communication therewith of the said trap, a pipe E, leading from the tank and connected at its lower end with the upper tapering end of the cone, and means, substantially as described, for controlling the discharge of water from the tank through the pipes D and E, substantially as set forth.

4. In a water-closet, the combination, with the flushing-tank C and bowl A, provided with a trap B, leading into a waste-pipe r, of pipes D and E, extending at their upper ends into the tank and terminating therein in siphon-traps and leading at their lower ends respectively into the bowl and waste-pipe, an air-trap G in the tank, communicating with both siphon-traps and connected with lever mechanism operated from near the bowl, and a hollow cone F at the lower end of the pipe E, substantially as described.

5. In a water-closet, the combination, with the flushing-tank C and bowl A, provided with a trap B, leading into a waste-pipe r, of pipes D and E, extending at their upper ends into the tank and terminating therein in siphon-traps and leading at their lower ends respectively into the bowl and waste-pipe, an air-trap G in the tank, communicating with both siphon-traps and charged with mercury and connected with lever mechanism operated from near the bowl, and a hollow cone F at the lower end of the pipe E, substantially as described.

6. In a water-closet, the combination, with the flushing-tank C and bowl A, provided with a trap B, leading into a waste-pipe r, of pipes D and E, extending at their upper ends into the tank and terminating therein in double-trapped siphon-coils, and leading at their lower ends respectively into the bowl and waste-pipe, an air-trap G in the tank charged with mercury and communicating with the siphon-coils between the traps thereof and connected with lever mechanism operated from near the bowl, and a hollow cone F, connected at its tapering extremity with the lower end of the pipe E and at its flaring extremity with the upper end of the pipe r, substantially as described.

DAVID WHITEFORD.

In presence of—
J. W. DYRENFORTH,
M. J. FROST.